(12) United States Patent
Wegeng et al.

(10) Patent No.: US 9,950,305 B2
(45) Date of Patent: Apr. 24, 2018

(54) SOLAR THERMOCHEMICAL PROCESSING SYSTEM AND METHOD

(75) Inventors: Robert S. Wegeng, Richland, WA (US); Paul H. Humble, Kennewick, WA (US); Shankar Krishnan, Wilsonville, OR (US); Steven D. Leith, Albany, OR (US); Daniel R. Palo, Chisolm, MN (US); Robert A. Dagle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 525 days.

(21) Appl. No.: 13/559,127

(22) Filed: Jul. 26, 2012

(65) Prior Publication Data

US 2013/0025192 A1    Jan. 31, 2013

Related U.S. Application Data

(60) Provisional application No. 61/511,788, filed on Jul. 26, 2011.

(51) Int. Cl.
*C10L 1/12* (2006.01)
*B01J 19/12* (2006.01)
(Continued)

(52) U.S. Cl.
CPC ............ *B01J 19/127* (2013.01); *C01B 3/384* (2013.01); *C01B 3/48* (2013.01); *C10G 2/30* (2013.01);
(Continued)

(58) Field of Classification Search
CPC ............ B01J 19/127; B01J 2219/00006; B01J 2219/00159; B01J 2219/0883; B01J 2219/089; C01B 2203/0233; C01B 2203/0283; C01B 2203/0445; C01B 2203/061; C01B 2203/0855; C01B 3/384; C01B 3/48; C01B 2203/1288; C10G 2/30;
(Continued)

(56) References Cited

U.S. PATENT DOCUMENTS 4,668,494 A   5/1987  Van Hook et al.
6,872,378 B2  3/2005  Weimer et al.
(Continued)

FOREIGN PATENT DOCUMENTS

WO    WO              1/2015
      PCT/US2013/052312

OTHER PUBLICATIONS

Petrasch et al. "Dynamics of a solar thermochemical reactor for steam-reforming of methane" Chemical Engineering Science. vol. 62. Apr. 2007. pp. 4214-4228.*

(Continued)

*Primary Examiner* — Latosha Hines
(74) *Attorney, Agent, or Firm* — Wells St. John P.S.

(57) ABSTRACT

A solar thermochemical processing system is disclosed. The system includes a first unit operation for receiving concentrated solar energy. Heat from the solar energy is used to drive the first unit operation. The first unit operation also receives a first set of reactants and produces a first set of products. A second unit operation receives the first set of products from the first unit operation and produces a second set of products. A third unit operation receives heat from the second unit operation to produce a portion of the first set of reactants.

16 Claims, 13 Drawing Sheets

(51) Int. Cl.

| | | |
|---|---|---|
| C01B 3/38 | (2006.01) | |
| C01B 3/48 | (2006.01) | |
| C10G 2/00 | (2006.01) | |
| C10K 3/04 | (2006.01) | |
| F01K 3/18 | (2006.01) | |
| F22B 1/00 | (2006.01) | |
| H01M 8/0612 | (2016.01) | |
| F24J 2/07 | (2006.01) | |

(52) U.S. Cl.
CPC ............... *C10K 3/04* (2013.01); *F01K 3/188* (2013.01); *F22B 1/006* (2013.01); *F24J 2/07* (2013.01); *H01M 8/0612* (2013.01); *B01J 2219/00006* (2013.01); *B01J 2219/00159* (2013.01); *B01J 2219/089* (2013.01); *B01J 2219/0883* (2013.01); *C01B 2203/0233* (2013.01); *C01B 2203/0283* (2013.01); *C01B 2203/0445* (2013.01); *C01B 2203/061* (2013.01); *C01B 2203/0855* (2013.01); *C01B 2203/1288* (2013.01); *Y02E 10/41* (2013.01); *Y02P 20/129* (2015.11); *Y02P 20/134* (2015.11); *Y10T 29/49826* (2015.01); *Y10T 137/8593* (2015.04)

(58) Field of Classification Search
CPC ........ C10K 3/04; H01M 8/0612; Y02E 10/41; Y02E 60/50; Y10T 29/49826; Y10T 137/8593; F22B 1/006; F24J 2/07; Y02P 20/134; Y02P 20/129; F01K 3/188
USPC ........ 422/129, 162, 198, 618, 649; 429/415, 429/416; 44/457
See application file for complete search history.

(56) References Cited

U.S. PATENT DOCUMENTS

| | | |
|---|---|---|
| 2002/0031471 A1 | 3/2002 | Tonkovich et al. |
| 2002/0059869 A1 | 5/2002 | Martin et al. |
| 2002/0194990 A1* | 12/2002 | Wegeng ............... B01D 53/06 95/114 |
| 2003/0015093 A1 | 1/2003 | Wegeng et al. |
| 2003/0031613 A1 | 2/2003 | Tonkovich |
| 2003/0180216 A1 | 9/2003 | TeGrotenhuis et al. |
| 2003/0208959 A1 | 11/2003 | Weimer et al. |
| 2004/0013606 A1 | 1/2004 | Tonkovich |
| 2004/0069144 A1 | 4/2004 | Wegeng et al. |
| 2004/0105812 A1 | 6/2004 | Tonkovich |
| 2005/0247552 A1 | 11/2005 | TeGrotenhuis et al. |
| 2006/0029541 A1 | 2/2006 | Tonkovich et al. |
| 2006/0034754 A1 | 2/2006 | Wegeng et al. |
| 2006/0034755 A1 | 2/2006 | Wegeng et al. |
| 2006/0045842 A1 | 3/2006 | Wegeng et al. |
| 2006/0067861 A1 | 3/2006 | Tonkovich et al. |
| 2006/0115413 A1 | 6/2006 | Wegeng et al. |
| 2008/0173533 A1 | 7/2008 | Mankins et al. |
| 2008/0175766 A1 | 7/2008 | Mankins et al. |
| 2008/0283109 A1 | 11/2008 | Mankins et al. |
| 2009/0211735 A1 | 8/2009 | Stenkamp et al. |
| 2010/0098599 A1* | 4/2010 | Mankins ............... B01J 19/0093 422/148 |
| 2010/0237291 A1 | 9/2010 | Simmons et al. |
| 2011/0294907 A1 | 12/2011 | Allam |
| 2012/0131898 A1 | 5/2012 | Mokheimer et al. |
| 2012/0145965 A1 | 6/2012 | Simmons et al. |

OTHER PUBLICATIONS

International Search Report/Written Opinion for International Application No. PCT/US2013/052312, International Filing Date Jul. 26, 2013, dated Oct. 14, 2014.

Dharaiya, V. V., et al., Evaluation of a Tapered Header Configuration to Reduce Flow Maldistribution in Minichannels and Microchannels, Proceedings of the ASME 2009 7th International Conference on Nanochannels, Michannels and Minichannels, Jun. 22-24, 2009, Pohang, South Korea, ICNMM2009.

Saber, M., et al., Microreactor Numbering-up in Multi-Scale Networks for Industrial-Scale Applications: Impact of Flow Maldistribution on the Reactor Performances, Chemical Engineering Science, 65, 2010, 372-379.

Yue, J., et al., Flow Distribution and Mass Transfer in a Parallel Microchannel Contractor Integrated with Constructal Distributors, AlChe Journal, 56, 2, 2010, 298-317.

Du Marchie Van Voorthuysen, E. H., The Promising Perspective of Concentrating Solar Power (CSP), International Conference on Power Systems, vol. 2005, 2005.

Angelino, G., et al., Binary Conversion Cycles for Concentrating Solar Power Technology, Solar Energy, 82, 2008, 637-647.

Lovegrove, K., et al., Developing Ammonia Based Thermochemical Energy Storage for Dish Power Plants, Solar Energy, 76, 2004, 331-337.

Trommer, D., et al., Hydrogen Production by Steam-Gasification of Petroleum Coke Using Concentrated Solar Power—I. Thermodynamic and Kinetic Analyses, International Journal of Hydrogen Energy, 30, 2005, 605-618.

Hong, Hui, et al., Solar Thermal Power Cycle With Integration of Methanol Decomposition and Middle-Temperature Solar Thermal Energy, Solar Energy, 78, 2005, 49-58.

Cao, C., et al., Heterogeneous Reactor Model for Steam Reforming of Methane in a Microchannel Reactor With Microstructured Catalysts, Catalysis Today, 110, 2005, 92-97.

Philippe, R., et al., Effect of Structure and Thermal Properties of a Fischer-Tropsch Catalyst in a Fixed Bed, Catalysis Today, 1475, 2009, S305-S312.

Hogan, Jr., R. E, et al., A Direct Absorber Reactor/Receiver for Solar Thermal Applications, Chemical Engineering Science, 45, 8, 1990, 2751-2758.

Muir, J. F., et al., Solar Reforming of Methane in a Direct Absorption Catalytic Reactor on a Parabolic Dish: 1—Test and Analysis, SAND-90-2674c, 1990.

Buck, R., et al., Carbon Dioxide Reforming of Methane in a Solar Volumetric Receiver/Reactor: The CAESAR Project, Solar Energy Materials, 24, 1991, 449-463.

Bohmer, M., et al., Solar Steam Reforming of Methane, Solar Energy Materials, 24, 1991, 441-448.

Schreiber, J. G., Summary of Stirling Convertor Testing at NASA Glenn Research Center, NASA/TM-2006-214429, 2007.

Wang, Y., et al., Highly active and stable Rh/MgO—Al2O3 catalysts for methane steam reforming, Catalysis Today, 98, 2004, 575-581.

Wegeng, R. S., et al., Solar Thermal Production of Fuels, International Energy Conversion Engineering Conference, Jul. 2007.

Whyatt, G. A., et al., Demonstration of Energy Efficient Steam Reforming in Microchannels for Automotive Fuel Processing, Microreaction Technology, 2001, Springer-Verlag, Berlin, 303-312.

Muir, J. F., et al., The CAESAR Project: Experimental and Modeling Investigations of Methane Reforming in a Catalytically Enhanced Solar Absorption Receiver on a Parabolic Dish, SAND92-2131, Jul. 1993.

* cited by examiner

SOLAR THERMOCHEMICAL PROCESSING SYSTEM AND METHOD

CROSS-REFERENCE TO RELATED APPLICATIONS

This application claims priority to U.S. Provisional Application Ser. No. 61/511,788, filed Jul. 26, 2011, titled "SYSTEMS AND METHODS INVOLVING SOLAR THERMOCHEMICAL REACTIONS", hereby incorporated by reference in its entirety for all of its teachings.

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to solar thermochemical reactions. More specifically, this invention relates to systems and methods that use high-temperature heat, available from solar concentrators, to increase the chemical energy content and/or change the chemical composition of a reacting stream.

BACKGROUND OF THE INVENTION

The Department of Energy's goals for concentrated solar power (CSP) systems include increasing the use of CSP in the United States, making CSP competitive in the intermediate power market by 2015 and developing advanced technologies that will enable CSP to be competitive in the baseload market by 2020. CSP traditionally uses concentrated solar energy to drive heat engines, such as the Rankine Cycle, Brayton Cycle and the Stirling Cycle, producing electricity. Traditional CSP systems have a limited capacity factor in the range of 20-25% since they generate electricity only when direct sunlight is available. This limits the ability of CSP to be used for baseload power generation. The capacity factor for CSP systems can be increased by storing energy received at the collector in a form that can be converted to electricity at later times. Storing solar energy as sensible or latent heat is one option.

Another promising option is converting solar energy to chemical energy in a thermochemical reaction. In this case the energy is stored in the chemical product and this chemical energy can be released as heat for power generation at a later time in an exothermic chemical reaction. An advantage of this closed cycle approach is that the chemical products can be stored at ambient temperatures simplifying transport and storage requirements, and enabling longer term storage without energy degradation. An open cycle approach to solar-thermal to chemical energy conversion is also possible. For instance, solar reforming can be used to upgrade the chemical energy content of a fuel stream such as methane from natural gas or biomass when the sun is available, and this upgraded fuel stream can be used to generate electricity using a heat engine or fuel cell. When direct sunlight is not available, the fossil fuel or biomass energy source can still be used to generate electricity using the same infrastructure. Such a system can be used for baseload power generation and can take advantage of solar energy at high conversion efficiencies when available. Thermochemical energy conversions may also enable CSP systems to co-generate electricity and fuels for other markets (e.g., transportation). Methanol and long-chain hydrocarbons are examples of products that can be produced from syngas, which is a product of a reforming reactor.

SUMMARY OF THE INVENTION

A solar thermochemical processing system is disclosed, in accordance with one embodiment of the present invention. The system includes a first unit operation for receiving concentrated solar energy, using heat from the solar energy to drive the first unit operation, wherein the first unit operation also receives a first set of reactants and produces a first set of products. The system further includes a second unit operation for receiving the first set of products from the first unit operation and for producing a second set of products. The system also includes a third unit operation for receiving heat from the second unit operation to produce a portion of the first set of reactants.

In one embodiment, the first unit operation is an endothermic reactor, the second unit operation is an exothermic reactor, and the third unit operation is a vaporizer.

In one embodiment, the endothermic reactor is a solar thermochemical reactor or a reverse-water gas shift reactor. The exothermic reactor is a methanol synthesis reactor, a Fischer-Tropsch reactor, a water-gas shift reactor, or a methanation reactor. The water-gas-shift reaction is used to increase the hydrogen content of a syngas stream, such as might be desirable for a PEM fuel cell or a chemical process where the desired product is hydrogen.

The channels inside the solar thermochemical reactor contain an active catalyst. The first set of reactants are reacted in the presence of the catalyst.

In one embodiment, the methanol synthesis reactor provides heat to the vaporizer and produces syngas and methanol. The syngas and methanol are passed to a separator where the methanol is recovered. Components of the syngas can be used to provide heat for a heat engine through a combustion process and/or to power a fuel cell.

In some embodiments, the system includes a heat pump for taking in heat from the methanol synthesis reactor and providing additional heat to the vaporizer. The system also includes a heat exchanger for preheating the reactants before entering at least one of the reactors and for cooling the products exiting at least one of the reactors.

The heat exchanger can be a micro-channel or meso-channel heat exchanger, and can have a minimum exergetic efficiency of about 85% and a minimum heat transfer power density of about 10 watts/cm$^3$.

In another embodiment of the present invention, a method of producing a fuel is disclosed. The method includes sending a first set of reactants into a first unit operation to produce a first set of products, and sending the first set of products to a second unit operation to produce a second set of products. The method further includes heating a third unit operation using heat from the second unit operation to produce a portion of the first set of reactants. The second set of products is further reacted to produce a fuel. The method also includes achieving carbon utilization in fuel production above approximately 85%.

In another embodiment of the present invention, a method of providing temperature control to a solar thermochemical reactor is disclosed. The method includes providing a solar thermochemical reactor including a first material, the first material having an inlet and an outlet. The method also includes providing a plurality of flow mechanisms for coupling the inlet to the at least one outlet separately. The method further comprises adjusting the flow mechanisms to control the proportion of fluid flowing through the inlet and the at least one outlet in response to conditions within the reactor. The flow mechanisms can have a different coefficient of thermal expansion than the first material.

In another embodiment of the present invention, a method of storing solar energy is disclosed. The method includes preheating reactants and then directing the reactants into a first endothermic reactor to produce a first set of products. The method further includes cooling the first set of products and then further reacting the first set of products in a first exothermic reactor to produce a second set of products. The heat of reaction from the exothermic reactor is used to produce a portion of the first set of reactants. The method also includes separating the second set of products to enable fuel to be stored. The separating allows methanol or long-chain hydrocarbons to be recovered with unreacted syngas components being sent on to provide either heat for a heat engine through a combustion process or to power a fuel cell.

In another embodiment of the present invention, a method of power generation is disclosed. The method includes preheating reactants and then directing the reactants into a first endothermic reactor to produce a first set of products. The method further includes cooling the first set of products and then further reacting the first set of products in a first exothermic reactor to produce a second set of products. The heat of reaction from the exothermic reactor is used to produce a portion of the first set of reactants. The method also includes separating the second set of products to provide heat for at least one of a heat engine and a fuel cell.

In another embodiment, a method of providing a solar energy augment to the chemical energy content of a reactant stream is disclosed. The method includes heating a solar reforming reactor from a solar concentrator; preheating reactants in a heat exchanger before entering the reactor; and reacting the reactants in the presence of a catalyst in the reactor to generate a product stream at a solar-to-chemical conversion efficiency greater than about 60%. The product stream includes syngas and the syngas is reacted in a chemical reactor to produce fuel. The method can also include cooling the product stream in the heat exchanger and sending the cooled product stream to an exothermic reactor, thereby producing higher energy products.

In another embodiment of the present invention, a solar thermochemical reactor for receiving heat and performing reactions is disclosed. The reactor includes a solar receiving front plate; a back plate with support ribs and an entrance port; a manifold; and a flow channel. A reactant flow enters near the center of the back plate and splits into multiple flow paths. The reactant flows toward the periphery of the reactor through a catalyst and exits as a product through the manifold. The manifold recollects the product to exit away from where the reactants entered the reactor. The reactor has a solar-to-chemical energy conversion efficiency of at least 60%.

The flow channels can comprise narrow size flow channels such as microchannels or mesochannels. Because of their narrow dimensions in the direction of heat or mass transfer, micro- and meso-channels can provide substantial improvements in heat exchangers and chemical reactors, including rapid heat transfer and reduced heat transfer resistance, therefore enabling process intensification and exergetically-efficient unit operations. This is especially useful for unit operations that must be closely associated with solar receivers, such that it might be desirable to place them at or near the focal point of a parabolic dish concentrator and within a compact housing.

The reactor comprises a solar thermochemical augment of at least 20%. In one embodiment, the reactor includes a passive structure to provide adaptive flow control within the reactor.

In another embodiment of the present invention, a tiled receiver reactor for receiving heat and performing reactions is disclosed. The reactor includes a solar receiving front plate and a back plate having individual tile sections. The tile sections include an inlet, at least one outlet, and catalyst channels. The length of at least one flow channel is decreased, making the inlet in closer proximity to the outlets.

In one embodiment, the reactor has a solar-to-chemical energy conversion efficiency of at least 60%, and a passive structure to provide adaptive flow control within the reactor.

In another embodiment of the present invention, a counter radial flow reactor for receiving heat and performing reactions is disclosed. The reactor includes outward flowing channels that enter the center of the reactor and flow in a radial direction toward outlets at the periphery of the reactor. The reactor also includes inward flowing channels, adjacent to the outward flowing channels, which enter at the periphery and exit toward the center of the reactor. The reactor can further include a passive structure to provide adaptive flow control within the reactor.

In another embodiment of the present invention, a solar gas-to-liquids process is disclosed. The process includes preheating a fluid stream including methane and water in a heat exchanger. The process further includes reacting the fluid stream in a solar thermochemical reactor to generate a product stream at a solar-to-chemical energy conversion efficiency of at least 60%, wherein the product stream includes syngas. The process also includes cooling the product stream in the heat exchanger; and reacting the syngas in a chemical reactor that produces fuel. In one embodiment, the carbon utilization is above about 85%.

In another embodiment of the present invention, a solar gas-to-liquids-and-electricity process is disclosed. The process includes preheating reactants and then directing the reactants into a first endothermic reactor to produce a first set of products. The process further includes cooling the first set of products and then further reacting the first set of products in a first exothermic reactor to produce a second set of products. The heat of reaction from the exothermic reactor is used to produce a portion of the first set of reactants. The process also includes separating the second set of products to provide heat for at least one of a heat engine and a fuel cell. In one embodiment, the carbon utilization is above 85%. In another embodiment, the carbon utilization is above 90%.

In another embodiment of the present invention, a receiver is disclosed. The receiver includes channel walls defining a flow channel; and a flow control device. The device includes an orifice cover partially blocking an outlet orifice, and wherein the device is coupled to the channel walls. Fluid in the flow channel may exit through the outlet orifice.

In one embodiment, the receiver is a heat exchanger or a reactor. The flow control device is made from a material with lower or higher thermal expansion compared to the flow channel. The material is, but not limited to, tungsten. The device can be coupled to the channel walls via two different length legs of the device.

In another embodiment of the present invention, a receiver is disclosed. The receiver includes a flow channel having an inlet and an outlet. The receiver also includes an insert coupled to the outlet. The insert has a lower or higher thermal expansion coefficient compared to the receiver. The receiver further includes a pin to constrain movement of the insert.

In one embodiment, the insert is constructed from a refractory material. The refractory material is, but not limited to, tungsten. In one embodiment, the receiver further comprises a plurality of flow channels. Each flow channel includes an inlet, an outlet, and an insert. Movement of the insert is constrained by a pin, and the receiver may be a heat exchanger or a reactor.

DETAILED DESCRIPTION OF THE PREFERRED EMBODIMENTS

Figure 1:
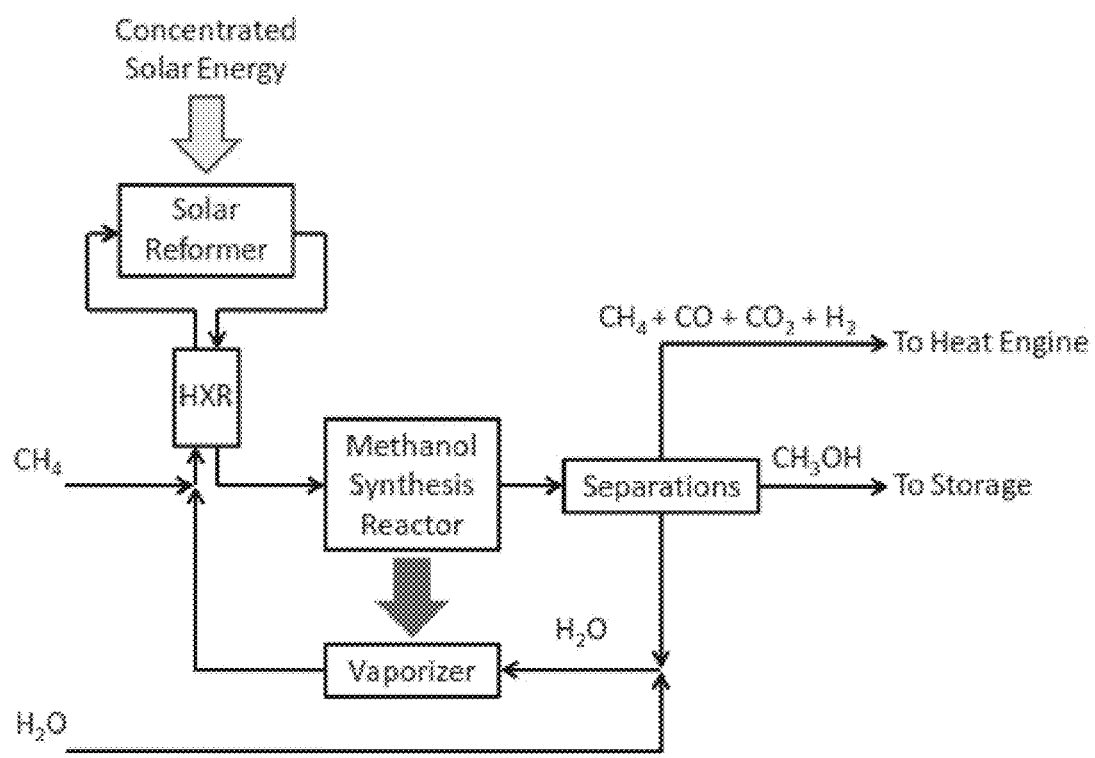
FIG. 1 is a process diagram of a solar thermochemical processing system, in accordance with one embodiment of the present invention.

The present invention is directed to the use of high-temperature heat that is available from solar concentrators to change the chemical composition or increase the chemical energy content of a reacting stream. Embodiments of the invention include, but are not limited to, open and closed-cycle chemical loops that efficiently convert concentrated solar energy into chemical energy through the use of chemical conversion reactions, and advanced process-intensive micro- and meso-channel process technology, which enables unit chemical operations to be made compact enough to be mounted at the focal point of a dish-concentrator, a central receiver, or another solar concentrator installation.

A microchannel may be of any length in the general direction of bulk flow and has one dimension, e.g., the width, that is greater than or equal to 1 micron and less than or equal to 5 millimeters.

A mesochannel may be of any length in the general direction of bulk flow and has one dimension, e.g., the width, that is greater than 5 millimeters and less than or equal to 5 centimeters.

It is especially useful to couple microchannel and mesochannel reactors and heat exchangers with solar concentrators, such as parabolic dish and central receiver concentrators, which by virtue of being able to concentrate direct normal solar energy by factors of 100 or 1000, or greater, provide sufficiently high fluxes and temperatures (e.g., greater than 500° C.) to enable high temperature endothermic reactions.

In certain embodiments, concentrated solar energy is used to drive an efficient, high temperature endothermic chemical reaction to produce higher energy products and to enable chemical energy storage. This fuel upgrading and chemical energy storage can be coupled with a heat engine or fuel cell to produce electricity at higher capacity factors and reduced costs compared to other solar energy systems.

In other embodiments, concentrated solar energy can be used to produce transportation fuels and other chemical products. For example, methane can be converted to synthesis gas (or 'syngas'), followed by a Fischer-Tropsch reaction to produce long-chain hydrocarbons, with subsequent additional processing steps to produce gasoline, diesel fuel, jet fuel, or other fuel products in what is known as a "gas-to-liquids" process. Conventional gas-to-liquids processes would consume a portion of the chemical content and energy in the feedstock reactants in order to drive endothermic gas-to-liquids operations, with one result being that a significant portion of the carbon in the methane feedstock is emitted from the plant as $CO_2$. Typically only about 60% of the feedstock carbon finds its way into the liquid hydrocarbon product. However, with the concentrated solar energy providing moderate- and high-temperature heat to drive endothermic unit operations, such as reforming and distillation, more effective utilization of the feedstock is realized, carbon dioxide emissions are substantially reduced, the plant produces a greater quantity of product fuel and reduced quantities of carbon dioxide, a greenhouse gas.

FIG. 1 is a process diagram of a solar thermochemical processing system, in accordance with one embodiment of the present invention. In this system, reactants such as, but not limited to, water and methane—available from natural gas or biomass (e.g., the effluent of an anaerobic digester)—are preheated and then reacted in an endothermic, steam-reforming reactor. The endothermic reactor is heated by concentrated solar energy from a parabolic dish or other solar concentrator. The product stream or 'reformate' is cooled and then further reacted to produce methanol in a downstream, exothermic reactor with the heat of reaction being used to vaporize the liquid water feed stream. A heat pump (not shown), such as vapor-compression, sorption or thermoelectric heat pump, can be included in the system for taking in heat from the methanol synthesis reactor and providing additional heat at a higher temperature to the vaporizer. A downstream separator allows methanol and water to be recovered with unreacted syngas components ($CH_4$, CO, $CO_2$ and $H_2$) being sent on to provide the heat for a heat engine through a combustion process. This enables part of the heating value of the product stream to be used immediately to produce power, while stored methanol is used for power generation at another time.

Figure 2:
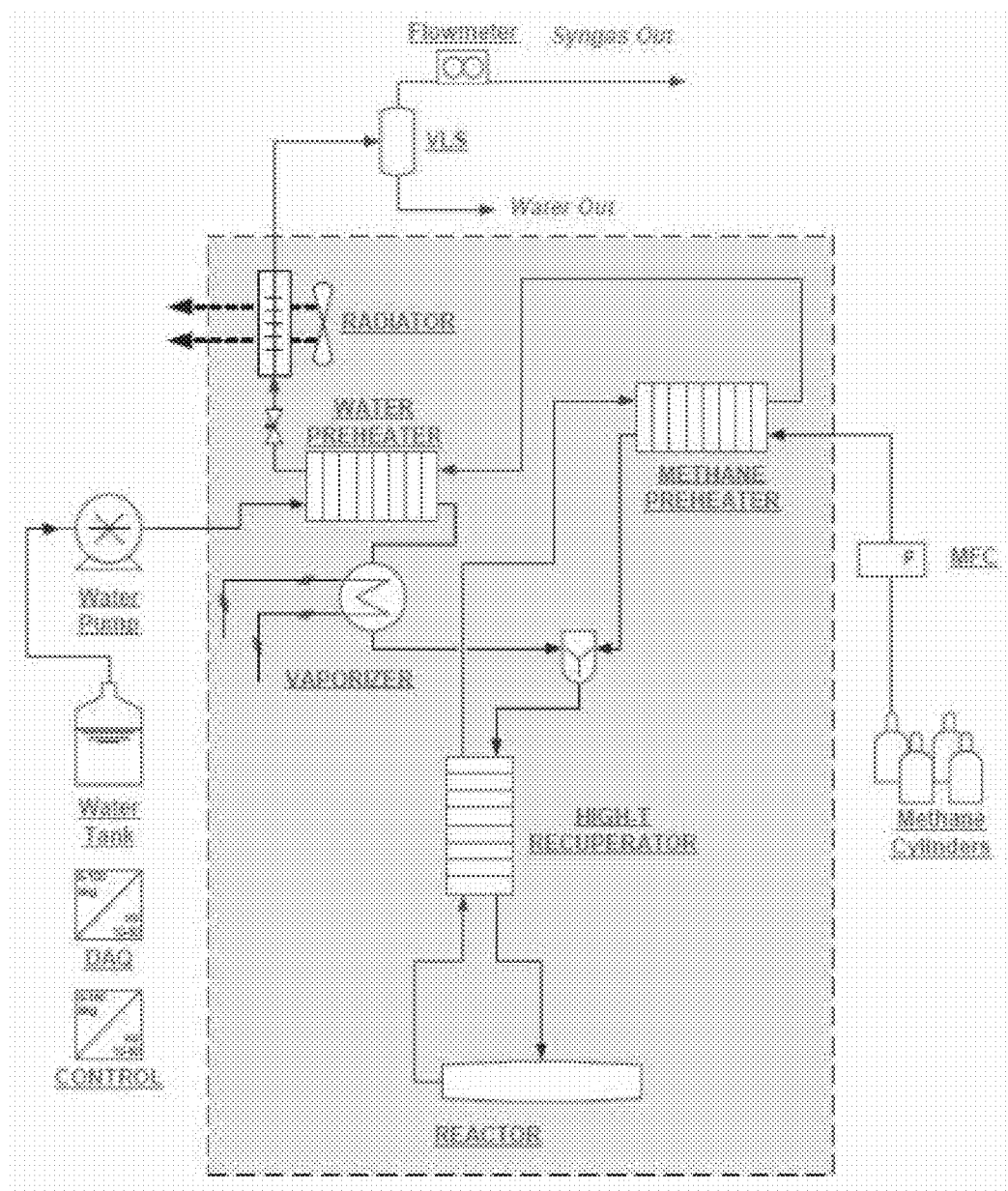
FIG. 2 is a process diagram of a solar thermochemical processing system, in accordance with one embodiment of the present invention.

FIG. 2 is a process diagram of a solar thermochemical processing system, in accordance with one embodiment of the present invention. In this embodiment, water and methane are fed to the system by positive displacement pumps and mass flow controllers, respectively, to control the steam to carbon ratio (S:C) and overall flow rate. Each stream is initially preheated through a counter-flow microchannel recuperative heat exchanger as shown, heated by the exhaust stream of the reforming operation.

Additional heat exchangers are shown in FIG. 2, compared to FIG. 1, providing preheating of reactants. The steam and methane are mixed before entering the high temperature heat exchanger or recuperator, where the combined stream is preheated, to the extent practical, to a temperature that is close to the operating temperature of the reforming reactor. The combined and preheated stream then enters the reforming reactor where the mixture passes over a methane steam reforming catalyst, absorbs solar heat at temperatures up to or higher than approximately 650° C., more preferably above 800° C. and is converted to syngas according to the methane reforming reaction and the water gas shift reactions, equations 1 and 2, respectively.

$$CH_4 + H_2O \rightarrow CO + 3H_2 \quad (1)$$

$$CO + H_2O \leftrightarrow CO_2 + H_2 \quad (2)$$

Because the combined reaction is highly endothermic, solar energy is effectively converted to chemical energy within the reformer. The hot syngas exiting the reactor immediately flows into the high-temperature recuperator where it preheats the combined methane/steam stream before feeding the low-temperature recuperator(s) mentioned above. Upon leaving the recuperator(s), the syngas stream flows through other heat exchangers and an air-cooled radiator where it is further cooled before flowing through a vapor-liquid separator (VLS) where condensed water is removed. The relatively dry syngas exiting the VLS is characterized in terms of flow-rate and composition, after which it is ready for use, either in a combustion-driven system or in a chemical process such as methanol synthesis.

Figure 3:
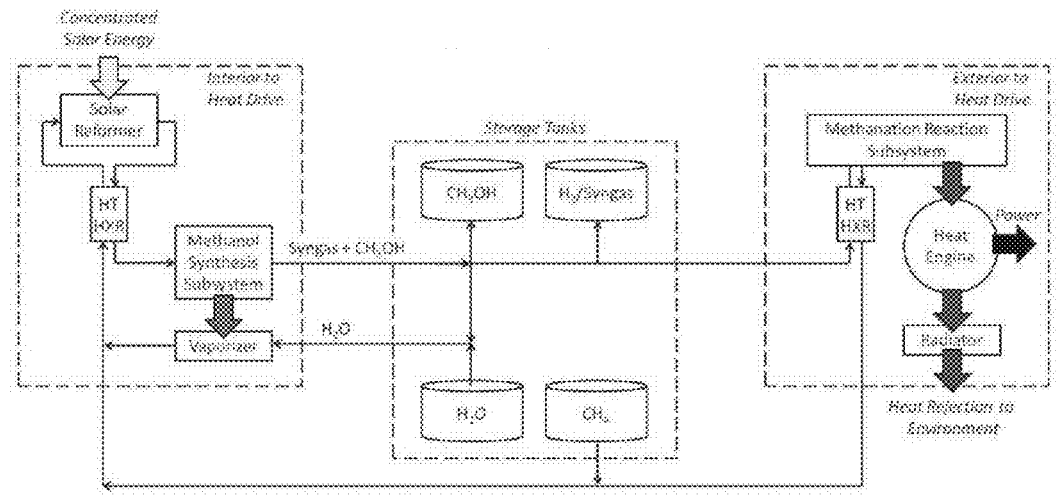
FIG. 3 is a process diagram depicting the operation of a solar thermochemical processing system during periods of sunlight, in accordance with one embodiment of the present invention.

FIG. 3 is a process diagram depicting the operation of a solar thermochemical processing system, in accordance with one embodiment of the present invention. During periods of sunlight, solar energy is efficiently converted to chemical energy, through the steps of methane reforming and methanol synthesis, with power generation occurring through the exothermic remethanation of a portion of the unconverted synthesis gas. Methanol and H2 or syngas are also stored during these operations.

Figure 4:
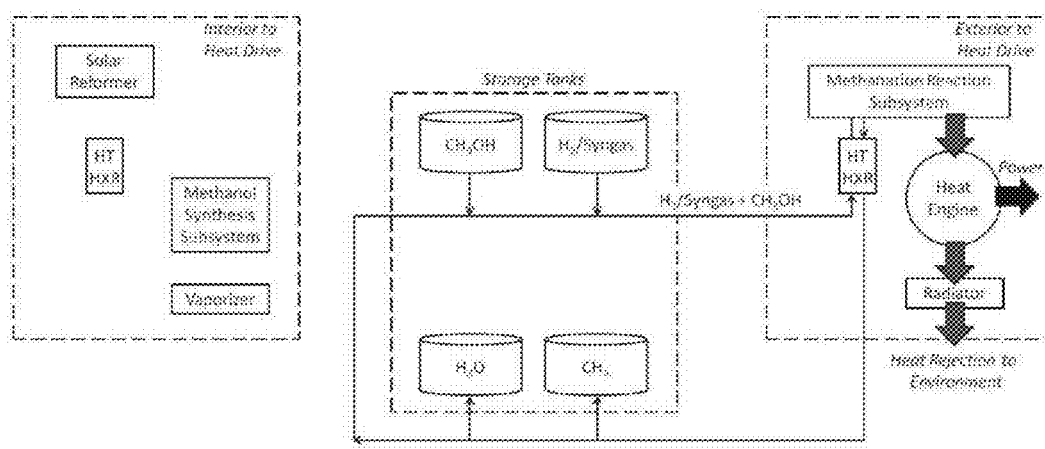
FIG. 4 is a process diagram depicting the operation of a solar thermochemical processing system during periods when sunlight is unavailable.

FIG. 4 is a process diagram depicting the operation of a solar thermochemical processing system of FIG. 3 during periods when sunlight is unavailable. When sunlight is unavailable stored methanol and H2 or synthesis gas is remethanated, producing heat for power generation, with water and methane being stored. Since the heat engine is not made integral to the dish-concentrator, the number and optimization of heat engines is decoupled from the number and optimization of dish-concentrators.

The heat engines in FIGS. 3 and 4 can be any of several types of thermodynamic cycles for heat engines, such as Rankine, Stirling or Brayton cycles.

Figure 5:
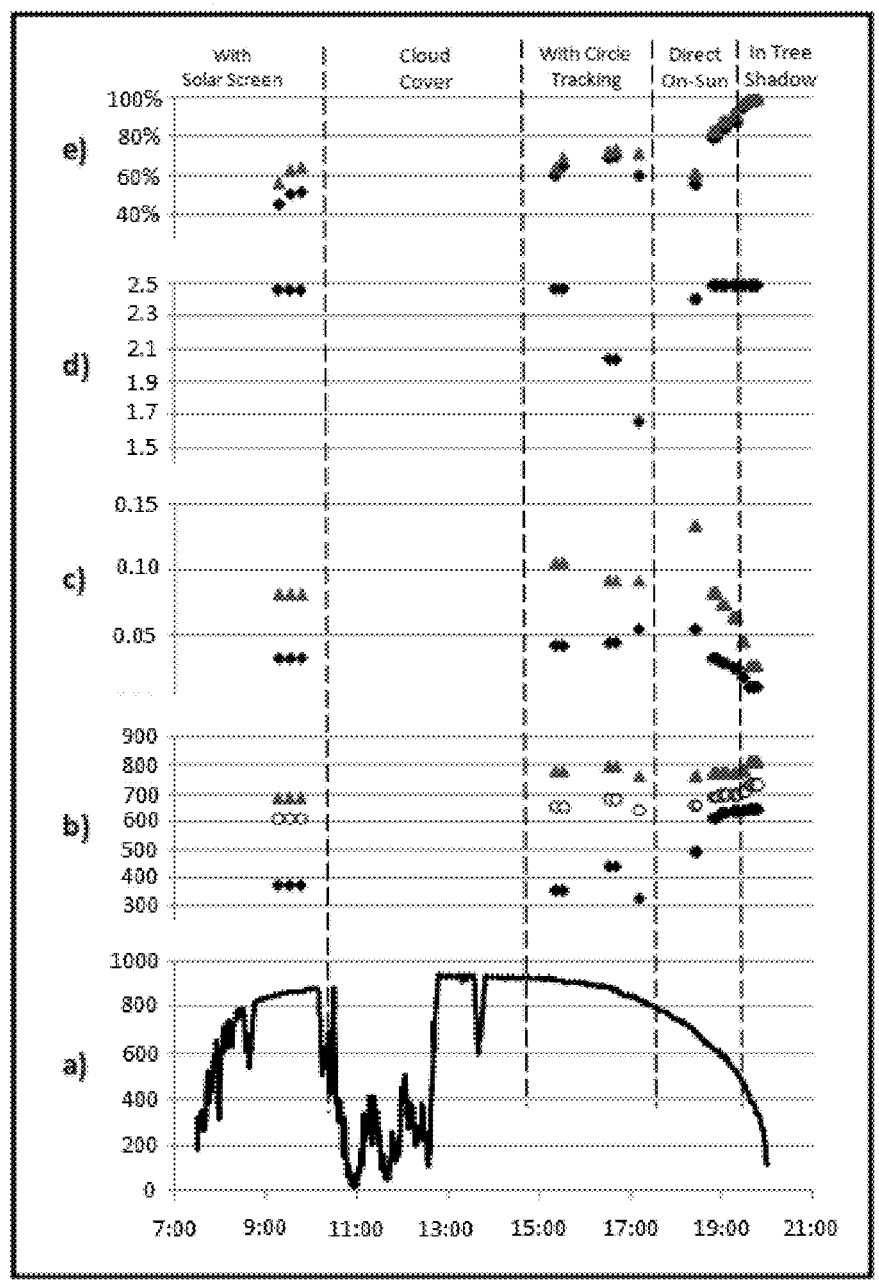
FIG. 5 is a summary of data from a day of shakedown testing with steam reforming of a solar thermochemical processing system under certain operating conditions.

FIG. 5 is a summary of data from a day of shakedown testing with steam reforming of a solar thermochemical processing system of FIG. 2 under certain operating conditions. On a previous date, the system was operated at low temperatures with a nitrogen-hydrogen stream for the initial reduction of the steam reforming catalyst and for trials of the control system. For steam reforming, three solar operating conditions were explored, one condition in which a screen was placed in front of the aperture to block roughly half of the solar flux ("screen condition"), therefore limiting the incoming solar flux during initial trial operations, a second condition in which the dish was moved in circular motion to "spill" a portion of the solar flux away from the aperture ("circle tracking"), and a third condition where complete solar flux was directed into the aperture of the receiver unit ("full sun").

System startup began with the use of the screen, allowing the reactor to be started with less than the full heat available from the solar concentrator. Circle tracking was used after the screen was removed, again to limit the solar flux on the reactor, with testing eventually progressing to full solar energy ("full sun"). The results of this day of testing are illustrated in FIG. 5, including conditions with the screen, with circle tracking, and with full sun. FIG. 5 also shows a period of testing, near the end of the day, where the dish was partially shadowed by a nearby tree.

The initial test condition, as shown in FIG. 5, was in screen mode and occurred between 9 a.m. and 10 a.m., where the solar flux was high (868±4 W/m²) and the screen provided about 50% attenuation of the solar flux to the reactor. Under this condition, the reactor inlet and outlet were at 373° C. and 610° C., respectively, which are highly non-ideal conditions for the reaction. Not surprisingly, conversion was low (45-52%), the change in higher heating value was on the order of 4 kW.

Due to significant mid-day cloud cover, the system was shut down in order to remove the screen and perform some system diagnostics. By about 2 p.m., the cloud cover had passed and the system was restarted.

The next few steady state values were obtained using circle tracking mode at increasing methane feed rates. Unfortunately, water pump issues caused the steam-to-carbon ratio to drift during this time. Nonetheless, the data obtained during this circle-tracking period yielded some useful results. Methane conversion increased during this time period as the reactor temperature (and product outlet temperature) continued to rise. Methane conversion relative to equilibrium conversion (at reactor outlet temperature), referred to as "conversion approach" also continued to rise, reaching as high as 75%.

The day's experiments concluded by operating the system with direct sun. By this time, the direct normal incidence (DNI) was beginning to wane, but the results are quite encouraging relative to our stated goals. For instance, our approach to equilibrium conversion continued to rise and reached a level of about 99% and overall methane conversion exceeded 90%. In addition, the overall solar-to-chemical energy conversion, calculated as the ratio of the increase in the Higher Heating Value of the reacting stream to the direct normal sunlight that was incident upon the dish concentrator, was calculated to be 63±4%, which represents the highest values of which we are aware. These exceptional results were enabled by the highly effective thermal recuperation provided by the microchannel heat exchangers, resulting in significant preheat of the reactant stream entering the reactor and allowing the majority of the concentrated solar energy to be used to drive the endothermic steam reforming reaction.

Figure 6:
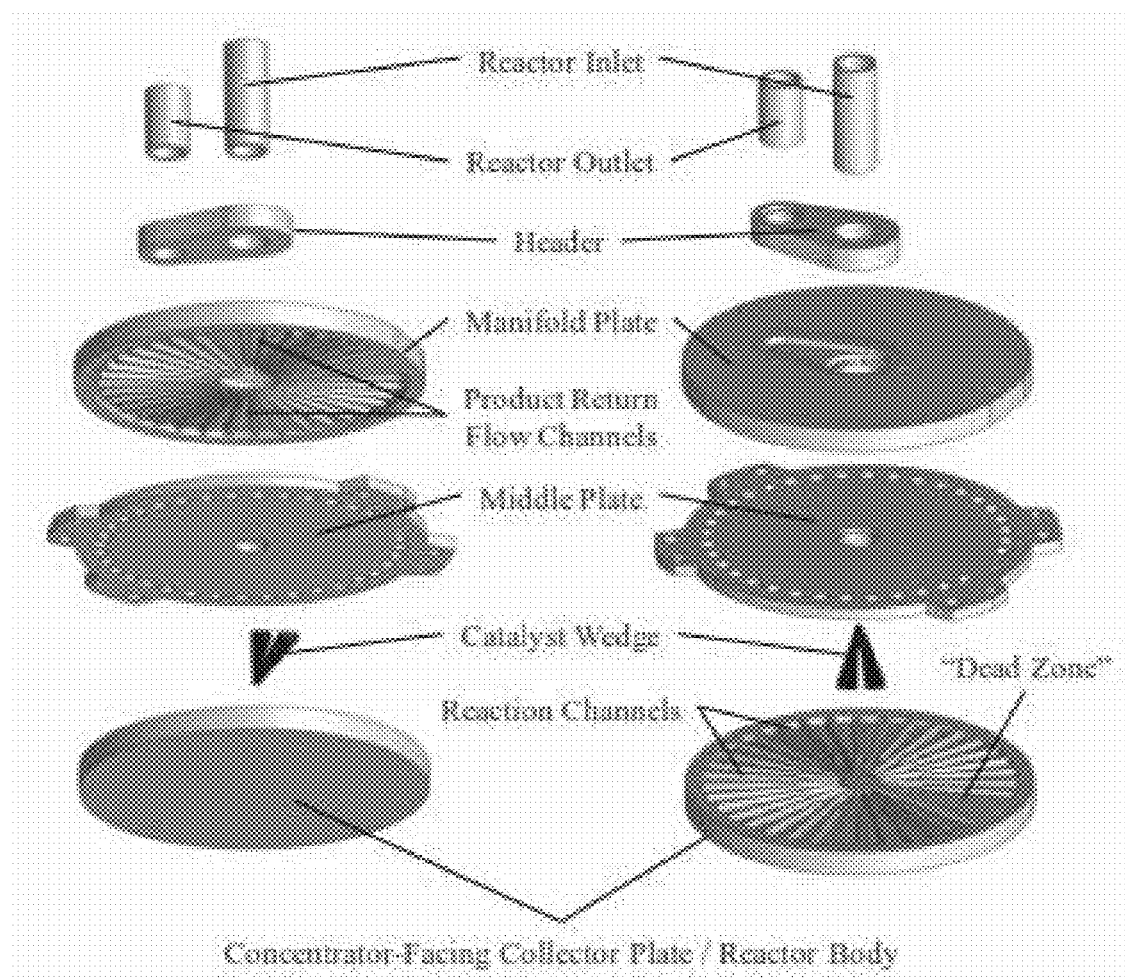
FIG. 6 is an exploded view of a solar reforming reactor, in accordance with one embodiment of the present invention.

FIG. 6 is an exploded view of a solar reforming reactor, in accordance with one embodiment of the present invention. The reactor is capable of extended high temperature and high pressure operation. In FIG. 6, the collector plate is the concentrator-facing plate of the assembly and also contains the reaction channels and steam reforming catalyst wedges. In one embodiment, the outer diameter and thickness of the collector plate are approximately 27.3 cm. and 1.9 cm. respectively, and the individual channels are mesochannels, approximately 0.6 cm. deep. It should be noted that the collector plate is not limited to these dimensions. A triangular-shaped "dead zone" is located within the collector plate and corresponds to an area where reduced solar flux will be received due to the design of the dish concentrator.

Use of a highly active catalyst is an enabling factor in the deployment of compact reactors, in which heat and mass transfer resistance has been minimized. Under such conditions, the reforming catalyst used here greatly outperforms standard base-metal reforming catalysts in terms of activity and coking. The combination of device architecture and catalyst selection enables process intensification, a key to capturing concentrated solar energy in a chemical process.

Also in FIG. 6 are the other portions of the solar reforming reactor, including a depiction of an individual "catalyst wedge", for insertion within a reaction channel, the middle plate, manifold plate and header for collection and routing of the reaction products, and the reactor inlet and reactor outlet. Exiting gases from the reaction channels/catalyst wedges flow out of the collector plate channels by way of the circular array of holes on the middle plate, through the product return flow channels, are collected and passed through the manifold plate and to the reactor outlet through a tapered channel on the back of the manifold plate. Note also that the reactor inlet tube is welded to the center hole of the middle plate, thus ensuring that the reactants and products do not mix.

Reaction channel geometries were developed that were more suited to the circular receiver geometry used on circular parabolic dish solar concentrators.

Figure 7:
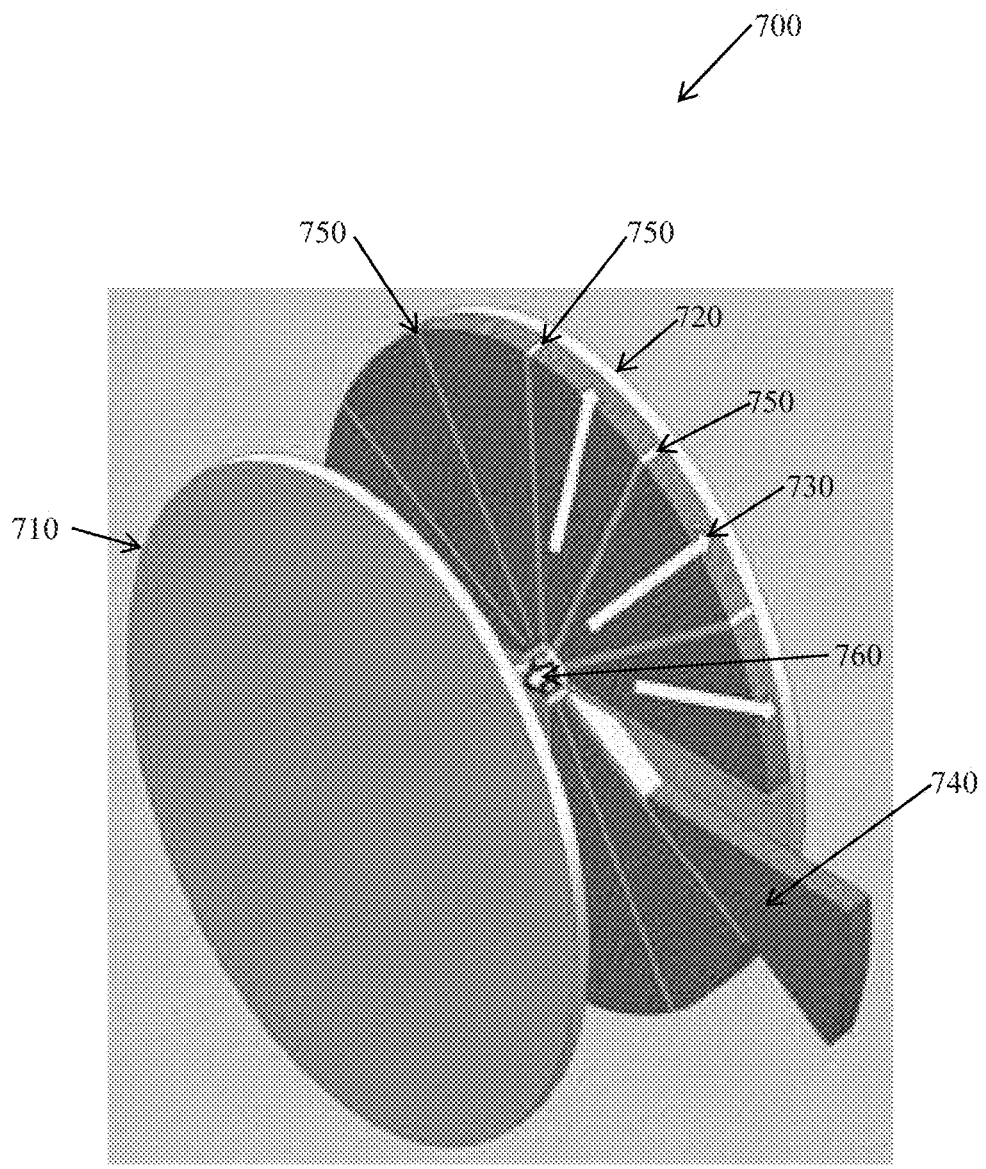
FIG. 7 is a radial flow receiver-reactor, in accordance with one embodiment of the present invention.

Radial flow is a natural choice for incorporating reaction channels into circular solar receiver geometry. FIG. 7 is a radial flow receiver-reactor 700, in accordance with one embodiment of the present invention. The reactor 700 includes a front plate 710, a back plate 720, support ribs 750, and a porous catalyst support 740 through which reactants flow. Reactants flow enter at the center 760 of the back plate 720, splits into multiple flow paths 730, flows toward the periphery of the device through the catalyst support 740, and exits through periphery manifolds (not shown). The flow of reacting gas would be either from the center 760 to the periphery of the reactor 700.

Another approach for incorporating reaction channels into a circular geometry is to divide the geometry up into smaller sections containing inlets, outlets and catalyst channels. These reactor "tiles" can be combined to fill the circular receiver area. An advantage of the tiled geometry is that the length of a given flow channel can be decreased making the cool inlets in closer proximity to hot outlets, and better enabling thermal conduction in the top plate to decrease the temperature gradients seen at the surface and in the top plate of the receiver-reactor. This advantage creates the ability to compensate for hot spots on the receiver surface due to aberrations or imperfections of the parabolic solar concentrator. With individual control of the flow through each tile section, areas receiving a higher solar flux could be fed more methane and steam.

Figure 8A:
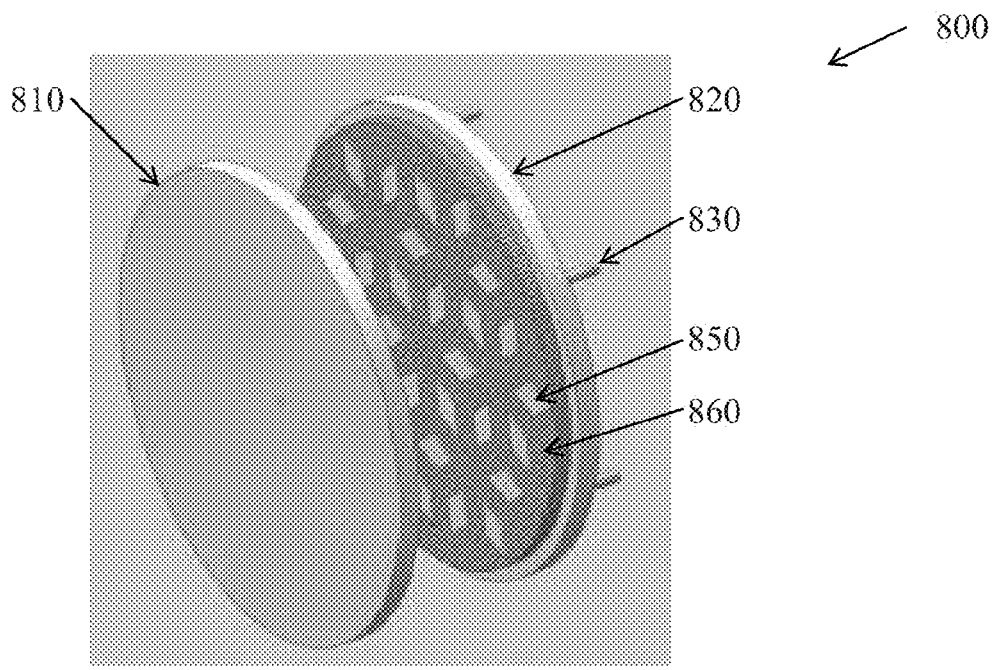
FIG. 8A is a front view of a tiled receiver-reactor, in accordance with one embodiment of the present invention.
Figure 8B:
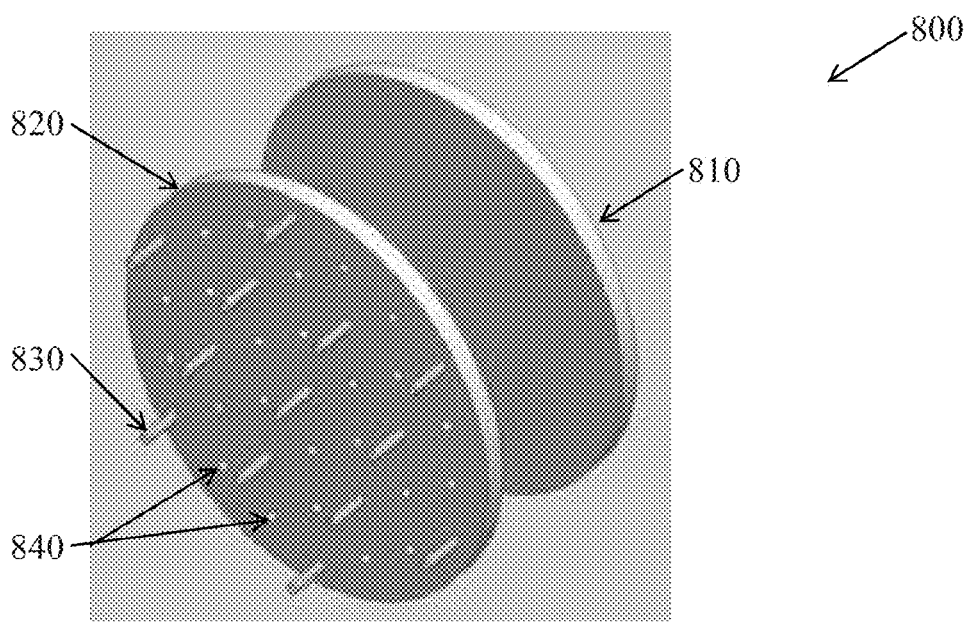
FIG. 8B is a rear view of a tiled receiver-reactor, in accordance with one embodiment of the present invention.

FIGS. 8A and 8B show a tiled receiver-reactor 800 incorporating metal heat conduction paths through a catalyst layer 860. FIG. 8A is a front view of a tiled receiver-reactor 800, and FIG. 8B is a rear view of the tiled receiver-reactor 800, in accordance with one embodiment of the present invention. The tiled receiver-reactor 800 include a front plate 810, a back plate 820, inlets 830, outlets 840, metal pieces 850, and the catalyst layer 860 where the reactants flow through.

There can also be a dead spot in the flow field. The catalyst in this area contributes little to the reaction. Although maximum temperatures are similar to the radial flow simulations, the smaller tile dimensions decrease temperature gradients and produce a more uniform temperature at the receiver surface.

The metal 850 in the center of the tile dramatically improves heat conduction to the back side of the catalyst channels 860. Compared to the previous tile geometry, this geometry with discrete flow channels and heat conduction paths to the back plate 820 requires significantly less catalyst material to achieve the same amount of methane conversion. These metal conduction paths also function as structural supports and greatly increase the strength of the reactor.

Figure 9:
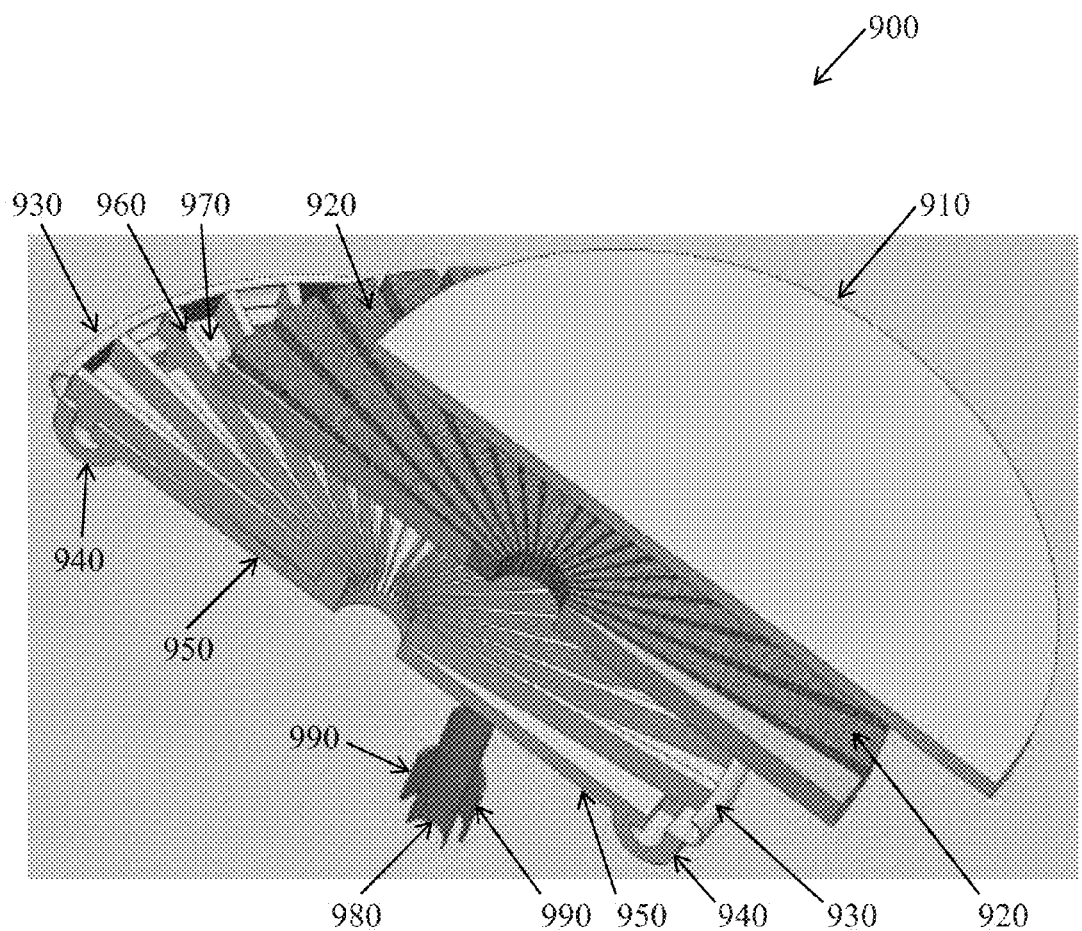
FIG. 9 is an exploded view of a counter radial flow receiver-reactor, in accordance with one embodiment of the present invention.

One of the issues with accomplishing a reforming reaction in a solar receiver-reactor is the uniformity or nonuniformity of the heat flux provided by a solar concentrator. It would be expected that the reforming reaction is most active at the inlet where methane concentrations are highest and lowest where the methane is depleted. However, if a constant heat flux per area on the receiver-reactor surface is accomplished, the reaction rate will be limited by the heat supplied and the temperatures achieved, and a more constant reaction rate in the channel may be realized. This happens as areas with a high methane concentration are cooler and areas with low methane concentration are hotter such that the higher catalyst activity (at higher temperatures) compensates for the low methane concentration. As a result, uniform heat flux on the receiver-reactor contributes to the temperature gradients and the maximum temperatures seen in the reactor structure. Lower maximum temperatures are desirable in that the strength and creep rupture resistance of the metal used to construct the reactor are higher, and catalyst deactivation lower at lower temperatures. In short, while higher temperatures may contribute to higher solar-to-chemical energy conversion efficiencies, running a portion of the receiver-reactor at excessively high temperatures will decrease the lifetime of the unit. A possible solution to this problem that can reduce excessive reactor temperatures is a geometry with counter flowing channels. In a counter-flow geometry the methane rich portion of one channel (the inlet portion) is placed adjacent to the methane depleted portion (outlet) of other channels, as shown in FIG. 9. This results in lower reactor temperatures in that heat is more easily channeled to areas within the reactor with high methane concentrations and high rates of reaction.

FIG. 9 is an exploded view of a counter radial flow receiver-reactor 900, in accordance with one embodiment of the present invention. The reactor 900 includes a front plate 910, porous catalyst pieces 920, an inlet header 930, an outlet header 940, a back plate 950, ribs 960, and flow channels 970. Also shown is a heat exchanger having an inlet tube 980 for preheating reactants before entering the reactor 900 and an outlet tube 980 for cooling products exiting the reactor 900.

In one embodiment, half of the reactants enter at the center of the reactor 900 and flow through the catalyst sections 920 to the periphery of the reactor 900; the other half of the reactants enter at the periphery and flow toward the center.

A counter-flow radial geometry, similar to FIG. 9, was simulated to investigate how the geometry could decrease the temperature at the receiver surface and reduce temperature gradients within the reactor. This geometry contains channels that enter the center of the receiver-reactor and flow in a radial direction toward outlets at the periphery of the circular reactor. Adjacent to these outward flowing channels are inward flowing channels that enter at the periphery and exit toward the center of the receiver-reactor. In the simulation only two such channels were modeled taking into account the symmetry of the geometry (only half of each channel was modeled in that a plane of symmetry runs down the center of each channel). As with the modified tiled geometry with a central metal section, this geometry benefits from the metal ribs that separate the flow channels. These ribs allow for heat conduction to the back plate of the reactor and help achieve more uniform temperatures through the catalyst. Although the headers shown in FIG. 9 at the periphery of the device connect all inflow channels and outflow channels together, if individual headers were used the flow to each channel could be controlled. This would enable some spatial control of the rate of reforming, and similar to the tiled receiver-reactor designs help maintain more uniform receiver temperatures with a non-uniform heat flux.

In the simulation, the maximum temperature at the receiver surface was approximately 60 to 80° C. cooler compared to the tiled or radial flow reactor geometries. The lower temperatures achievable with counter-flow geometry will have a significant beneficial impact on reactor strength and lifetime. However, the flow channels are more complex when compared to designs with radial flow in one direction, and this could increase the difficulty or cost of fabricating or assembling the reactor.

The present invention describes embodiments of several reactors with smaller catalyst channel thickness and geometries that incorporate metal ribs or other structures improve heat conduction which benefits reactor performance. Counter-flow geometry is beneficial in reducing the maximum temperature and temperature gradients. Excessively high reactor temperatures can decrease lifetime and the strength and creep rupture resistance of the reactor housing, and degrade catalyst performance.

Excessively cold temperatures are also to be avoided, as reaction kinetics and conversions are directly proportional for endothermic reactions. Thus there is a need to control localized reaction temperatures within a preferred temperature range.

Figure 10:
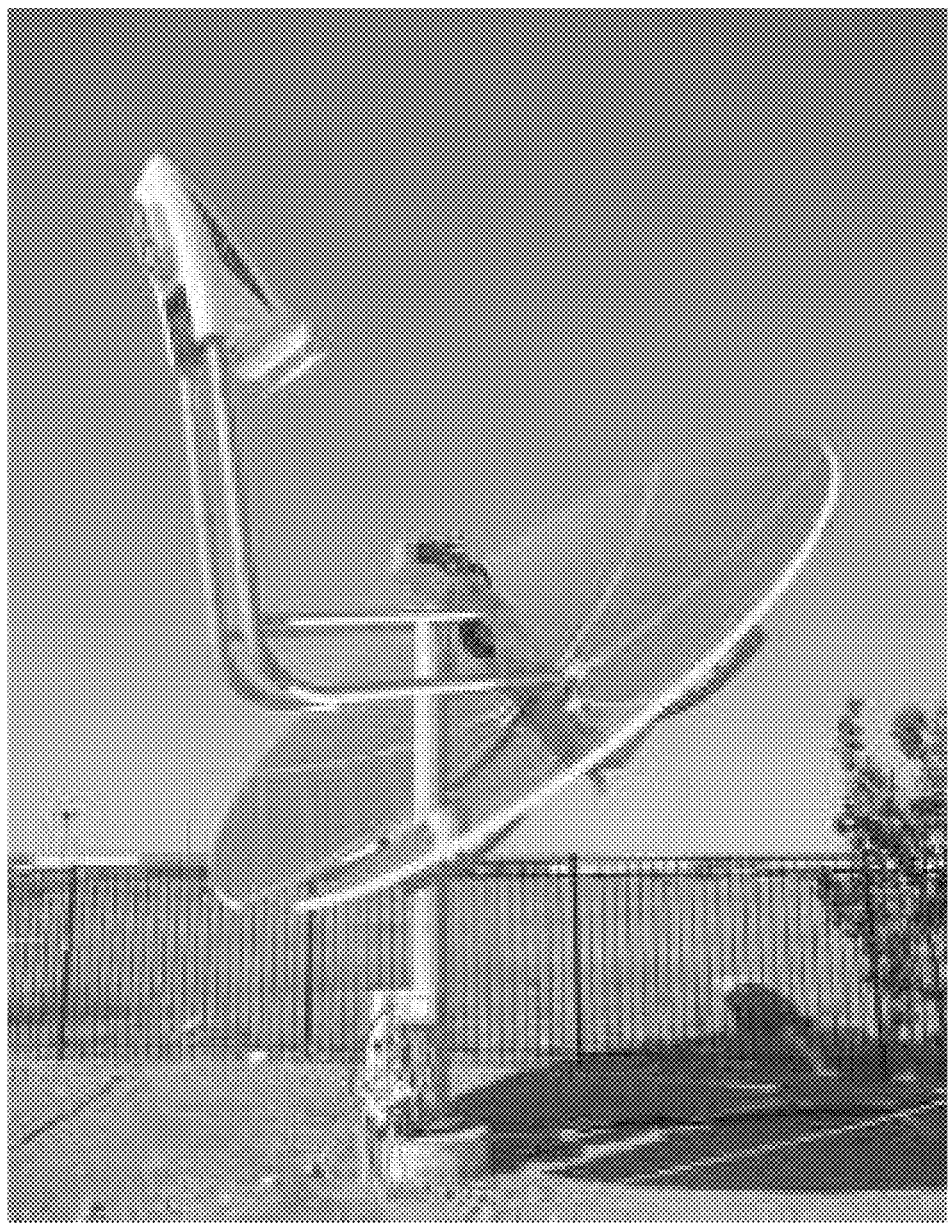
FIG. 10 is an implementation of parabolic dish concentrator for driving endothermic hydrocarbon reforming reactions, in accordance with one embodiment of the present invention.

FIG. 10 is a parabolic dish concentrator including endothermic and exothermic reactors, in accordance with one embodiment of the present invention. The parabolic dish concentrators provide heat to drive endothermic hydrocarbon reforming reactions, such as methane steam reforming.

The solar flux on a receiver surface is not uniform. The flux can vary with position, and maximum solar flux on a portion of the receiver can be 2 or 3 times the average flux. The receivers of the present invention are designed to cope with this nonuniform flux. Flow instabilities can also occur in receivers with multiple flow paths when large changes in the working fluids density and/or viscosity accompany the heat transfer process. Importantly, to maximize receiver efficiency it is desirable to have each portion of the receiver operating at close to an optimum flow rate that minimizes the temperature differences between the receiver's surface and working fluid and that maintains acceptable operating temperatures. Adaptive flow control may be used to accomplish this.

Passive flow control features can be used that exploit differences in thermal expansion to increase the flow to hotter sections of the receiver, minimizing hot spots and providing more uniform heating of the working fluid. In one embodiment, such flow control features consist of inserts of a refractory metal, such as tungsten, with a different thermal expansion coefficient than the receiver's body. The difference in thermal expansion is used to open up a flow feature, such as an orifice, increasing working fluid flow in hotter sections of the receiver and reducing fluid flow in colder sections. These adaptive flow features are designed to adjust the flow within an appropriate range based on working fluid properties and solar fluxes expected at the receiver's surface.

The use of adaptive flow control enhances flow stability and optimizes working fluid flow as a function of the solar flux incident on the receiver's surface. This type of adaptive flow control is desirable in solar receivers where the incident solar flux varies as a function of position. The desire to adaptively control the mass flow rate entering different portions of a heat exchange structure is somewhat unique to solar receivers. The control features of the present invention use differences in thermal expansion to increase the working fluid flow in hotter sections of the receiver, compensating for increased solar flux.

The terms "passive flow control" and "adaptive flow control" are used interchangeably. The term "adaptive" describes how the control device adjusts the flow depending on the temperature. The term "passive" emphasizes that the device self-adjusts without the intervention of an outside user or signal.

Figure 13:
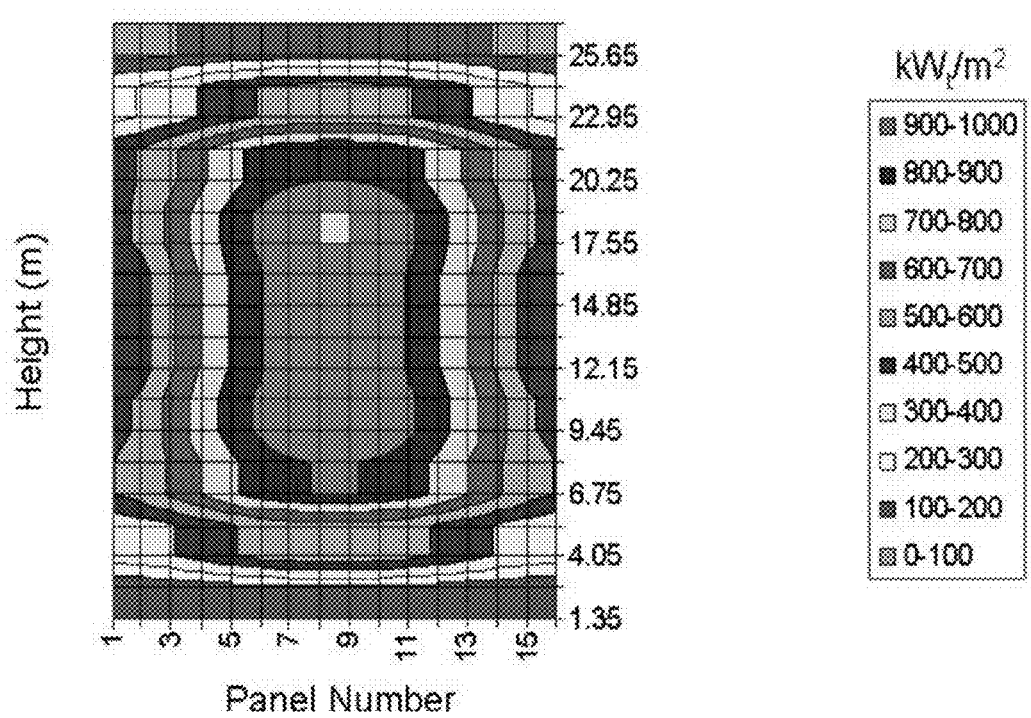
FIG. 13 shows a predicted solar flux map on receiver panels at noon on equinox as predicted by an optical design tool.

FIG. 13 shows the predicted solar flux map using DEL-SOL (an optical design tool) for a molten salt receiver panels at noon on equinox. From this map it can be seen that the solar flux varies almost an order of magnitude over the receiver surface; however the flux on the majority of the surface is within a factor of 3. It should also be noted that the solar flux distribution will vary as a function of time (time of day), and other environmental variables such as cloud cover. The spatial distances of the solar flux variability are large compared to the channel length used in a micro-channel solar receiver.

Figure 14:
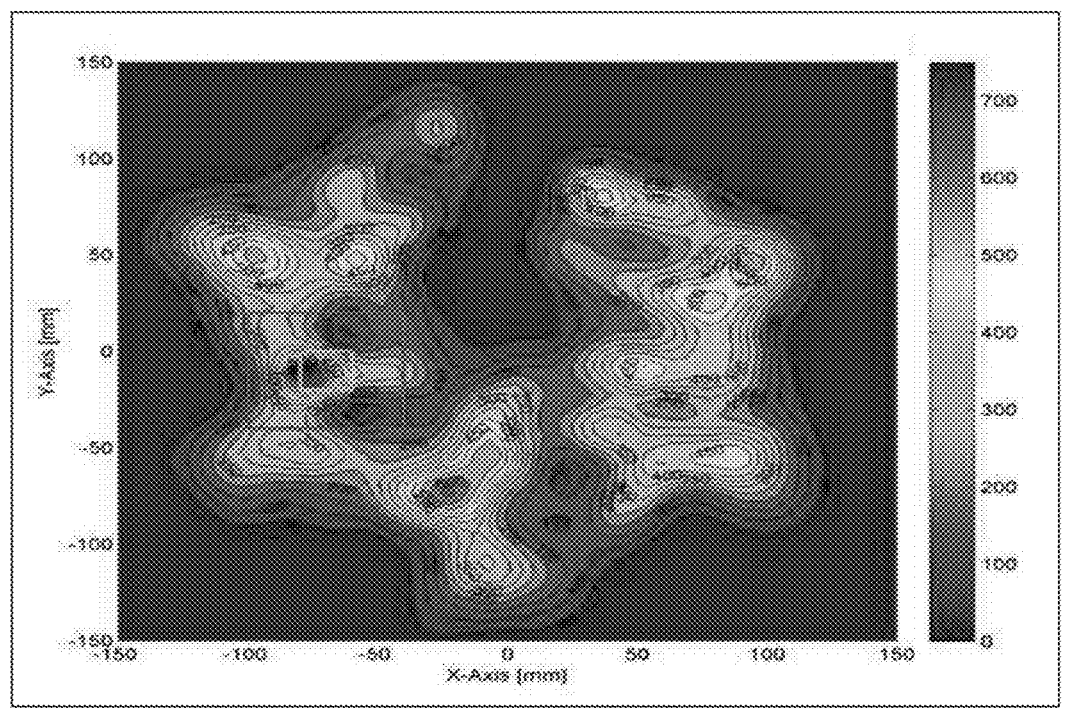
FIG. 14 shows the solar flux on a dish concentrator receiver.

FIG. 14 shows the solar flux on a dish concentrator receiver. In this case the spatial variability in the solar flux occurs over distances that are comparable to the length of flow channels used in a micro- or meso-channel receiver. Both central and parabolic dish receivers benefit from an adaptive flow control system able to increase flow in high flux regions of the receiver. Adaptive flow control allows the same receiver panel to work at any location in a central receiver. In the dish concentrator systems, adaptive flow control can be used to cope with the large solar flux variations over relatively small distances. In this case the adaptive control allows each flow channel to operate close to the design temperature to obtain maximum performance. The adaptive flow control should be able to throttle the flow a factor of 3 or 4 over a temperature range of 50-100° C.

Figure 11:
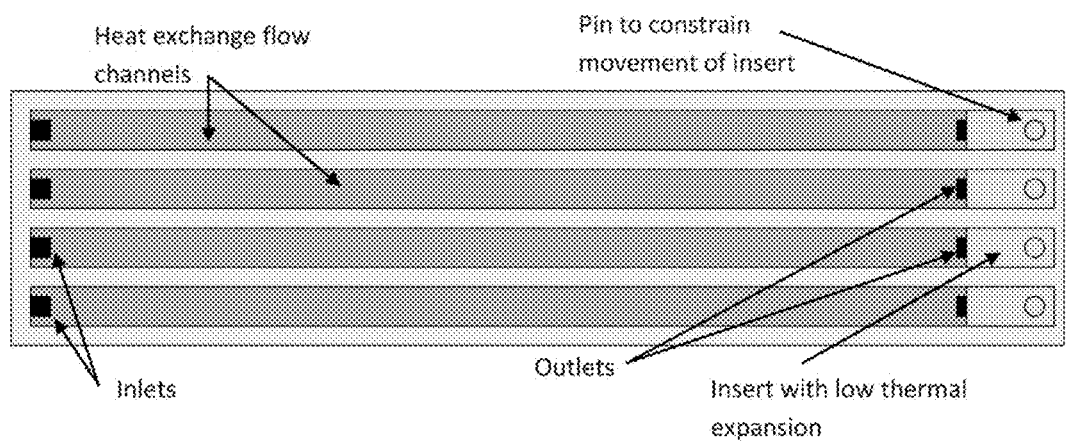
FIG. 11 is an adaptive flow feature for use in a microchannel solar receiver, in accordance with one embodiment of the present invention.

FIG. 11 illustrates one such adaptive flow feature, although other geometries and mechanisms are possible. In the FIG. 11, the adaptive flow is accomplished using an insert constructed from a refractory material such as tungsten with a low thermal expansion coefficient compared to the receiver body. Other materials besides tungsten can include, but are not limited to, ceramics, silicon and other metals. As the temperature of the receiver increases the channel length increases, and the length of the insert increases by a smaller amount. This opens up an orifice used to control the flow of hot working fluid exiting the heat transfer channel.

The adaptive flow control structure is designed to alter the flow—at the designed pressure drop—through the orifice or control feature changes in a way that compensates for the local heat flux, minimizing the differences in working fluid temperature exiting different portions of the receiver. FIG. 11 shows one adaptive flow feature of the present invention.

For a quantitative calculation, assume the receiver temperature is kept within 100° C. of target—assume it is in the range of 700 to 800° C. with a target of 750° C., and to accomplish this it is necessary to throttle the flow in different portions of the receiver from zero flow to full flow. In this case the adaptive flow control is needed to go from completely shut (zero flow) to fully open with a 100° C. temperature change. Microchannels with height dimensions of a few thousands of an inch may be used. The flow control passage will have similar dimensions and will assume a 0.001" relative motion between the two dissimilar metals is required to turn off the flow. Tungsten has a thermal expansion coefficient of approximately $4.7 \times 10^{-6}$ to $5.0331 \times 10^{-6}$ in/(in ° C.), and Hastalloy (refractory metal used to build the microchannel) has a thermal expansion coefficient of approximately $14 \times 10^{-6}$ in/(in ° C.). The difference in the thermal expansion between these materials is about $9 \times 10^{-6}$ in/(in ° C.). For a 100 C temperature change we can achieve a difference in length of about $9 \times 10^{-4}$, so to achieve a relative motion of 0.001" an adaptive flow control element with a length of 1.11" is required.

Figure 15A:
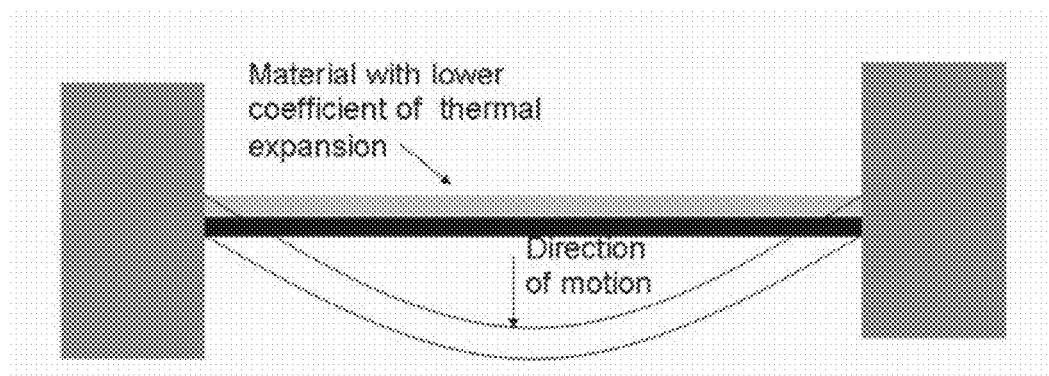
FIG. 15A shows how a bimetallic beam amplifies the motion that can be achieved due to thermal expansion.
Figure 15B:
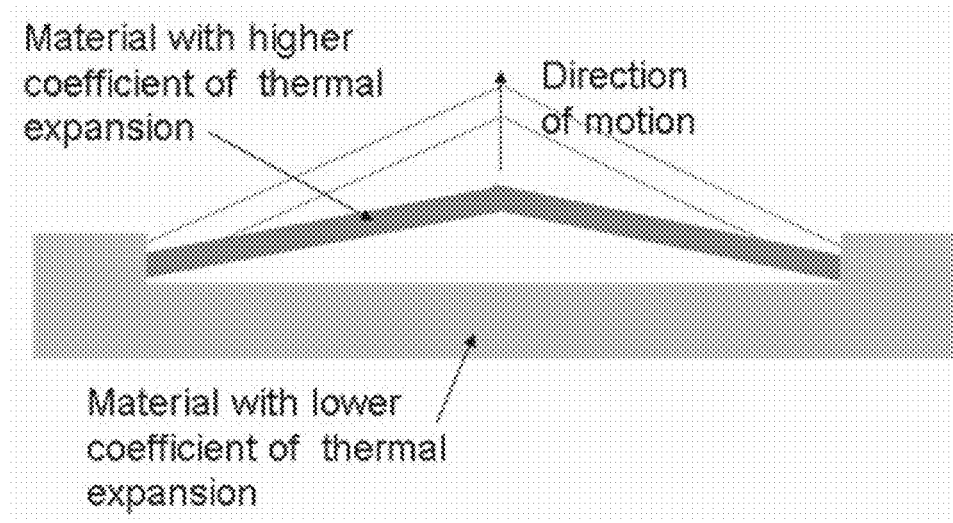
FIG. 15B shows how leverage can be used to amplify the linear displacement achieved due to thermal expansion.

It is also possible to build flow control features that use leverage to amplify the relative motion achieved from the thermal expansion. FIGS. 15A and 15B show some devices that amplify the motion due to thermal expansion. In these approaches the motion is increased at the cost of lower forces. Amplification of the maximum displacement can easily be increased at least one order of magnitude compared to the differences in thermal expansion of the different materials. These calculations and arguments show that the needed relative motion can be achieved using the differences in thermal expansion of Tungsten and Hastalloy without using leverage to amplify the motion. Actuator geometries are available that can amplify the motion, and these concepts can be adapted to actuate a flow control device.

To achieve the greatest actuation for a given temperature rise it is desirable to make the passive flow control device out of a material with a thermal expansion significantly different from the thermal expansion of the flow channel. For example, Tungsten with a thermal expansion coefficient of approximately $5 \times 10^{-6}$ cm/(cm ° C.) could be used to build a passive control device for use in a flow channel constructed from Hastalloy with a thermal expansion coefficient of approximately $14 \times 10^{-6}$ cm/(cm ° C.). One implementation of this concept is shown in FIG. 12.

Figure 12:
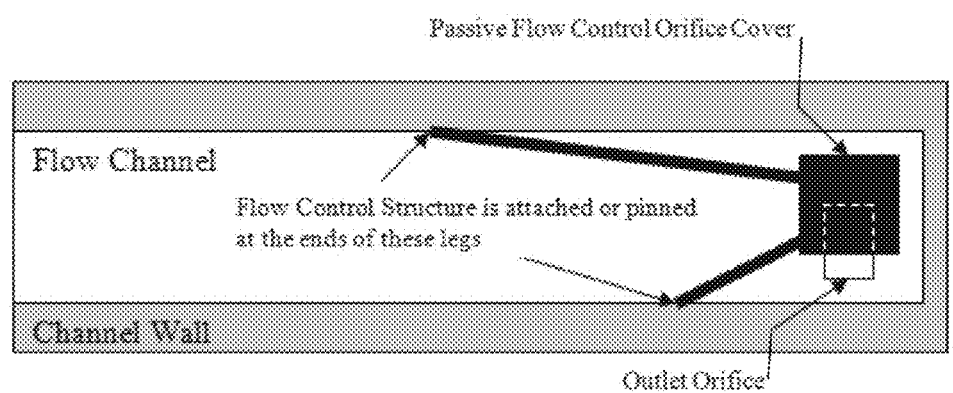
FIG. 12 is a passive flow control device, in accordance with one embodiment of the present invention.

FIG. 12 shows one implementation of a passive flow control device. In the flow channel, fluid flows from left to right and exits through the outlet orifice. The flow control device is made from a material with lower thermal expansion compared to the flow channel. The flow control device is attached to the channel walls at the ends of two different length legs and part of this device is an orifice cover that partially blocks the outlet orifice. As the fluid temperature increases, the flow channel and flow control device heat up. Differences in thermal expansion cause the control structure to rotate up, uncovering the outlet orifice and increasing the flow in the flow channel.

The device of FIG. 12 makes use of leverage to achieve a larger displacement of the orifice cover and greater opening of the outlet orifice, compared to what could be achieved due to thermal expansion alone. For example, consider a passive flow control device constructed from tungsten placed in a flow channel constructed from Hastalloy. The longer leg of the passive control device may be approximately 1.5 cm long, and the shorter leg may be 0.5 cm long. A 50° C. increase in temperature will result in a relative difference of about $4.5 \times 10^{-6}$ m for the flow channel length compared to the control structure over the 1 cm distance where the flow control structure is pinned to the flow channel. However, this modest $4.5 \times 10^{-6}$ m difference can result in the orifice cover moving upward by up to about $9.5 \times 10^{-4}$ m, amplifying the displacement over 100 times. Other geometries that amplify the displacement of an orifice cover are also possible.

The present invention also describes systems and methods of efficiently converting solar energy into chemical energy. Applications include thermochemical energy storage for concentrating solar power plants, which otherwise would be unable to produce electricity when sunlight is not available, and the production of synthetic transportation fuels from natural gas and/or biomass. High methane conversion was accomplished as well as relatively high solar-to-chemical energy conversion.

Also, the methanol synthesis reactor only partially converts syngas to methanol, so that the products of the system include both methanol and unconverted synthesis gas. In addition, the methanol synthesis reactor provides a substantial portion of the heat that is needed for water vaporization. It is through this integration of thermal components that high overall solar-to-chemical energy conversion can be obtained.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method of providing a solar energy augment to the chemical energy content of a reactant stream, the method comprising:
    heating a solar reforming reactor from a solar concentrator, the reactor comprising reactor channels and product return flow channels separated by a middle plate, the middle plate providing both a wall of the reactor channels and wall of the product return flow channels;
    preheating reactants in a heat exchanger before entering the reactor;
    reacting the reactants in the presence of a catalyst in the reaction channels of the reactor to generate a product stream; and
    conveying the product stream from the reaction channels to the product return channels while maintaining thermal contact across the middle plate and between the product stream and the reactants in the reaction zone.

2. The method of claim 1 further comprising combusting the product stream in order to provide heat to a power system or for other unit operations requiring heat.

3. The method of claim 2 wherein the power system or the unit operations requiring heat is a combined cycle, fuel cell or power plant, or a factory or chemical process facility requiring heat for steam generation.

4. The method of claim 1 further comprising providing the reactants to a centerpoint of the reactor and conveying the reactants through the reaction channels to a perimeter of the reactor.

5. The method of claim 1 further comprising exchanging the heat from the product stream with the reactants prior to the reactants entering the reaction zone.

6. The method of claim 1 wherein the product stream output is in thermal contact with the reactant stream intake.

7. The method of claim 1 wherein the solar thermochemical augment is at least 20%, wherein the solar thermochemical augment is measured as the increase in Higher Heating Value in the reacting stream divided by the Higher Heating Value of the reactants, times 100%.

8. The method of claim 1 wherein the product stream comprises syngas.

9. The method of claim 1 wherein the product stream is generated at a solar-to-chemical energy conversion efficiency greater than about 60%, wherein the product stream includes syngas, and wherein the solar thermochemical augment is at least 20%, wherein the solar thermochemical augment is measured as the increase in Higher Heating Value in the reacting stream divided by the Higher Heating Value of the reactants, times 100%.

10. A method of providing a solar energy augment to the chemical energy content of a reactant stream, the method comprising:
heating a solar reforming reactor from a solar concentrator, the reactor comprising reactor channels within a collector plate and product return flow channels within a manifold plate, the plates separated by a middle plate and defining a center and an outer perimeter in one cross section;
preheating reactants in a heat exchanger before providing the reactants to the center of the plates; and
reacting the reactants in the presence of a catalyst in the reaction channels of the collector plate to generate a product stream while providing the reactants and product stream from the center to the outer perimeter of the collector plate.

11. The method of claim 10 wherein the reactor channels are defined within the collector plate to extend from the center of the collector plate to the outer perimeter of the collector plate.

12. The method of claim 11 wherein one cross-sectional area of the reactor channels near the center of the collector plate is less than another cross-sectional area of the reactor channels near the outer perimeter of the collector plate.

13. The method of claim 10 further comprising conveying the product stream from the reaction channels to the product return channels.

14. The method of claim 13 wherein the product return flow channels are defined within the manifold plate to extend from the center of the manifold plate to the outer perimeter of the manifold plate.

15. The method of claim 14 wherein one cross-sectional area of the product return channels near the center of the manifold plate is less than another cross-sectional area of the product return channels near the outer perimeter of the manifold plate.

16. The method of claim 14 further comprising transferring product stream from the reaction channels through openings associated with an outer perimeter of the middle plate to the product return channels.

* * * * *